(12) United States Patent
Hasegawa et al.

(10) Patent No.: US 11,801,478 B2
(45) Date of Patent: Oct. 31, 2023

(54) NON-HYDROCARBON GAS SEPARATION DEVICE AND INORGANIC SEPARATION MEMBRANE REGENERATION METHOD

(71) Applicant: JGC Corporation, Yokohama (JP)

(72) Inventors: Hiroaki Hasegawa, Yokohama (JP); Syuichi Oguro, Yokohama (JP); Shogo Teratani, Yokohama (JP); Junya Okazaki, Yokohama (JP); Mizuki Takeuchi, Yokohama (JP)

(73) Assignee: JGC Corporation, Yokohama (JP)

( * ) Notice: Subject to any disclaimer, the term of this patent is extended or adjusted under 35 U.S.C. 154(b) by 132 days.

(21) Appl. No.: 17/273,775

(22) PCT Filed: Dec. 25, 2018

(86) PCT No.: PCT/JP2018/047579
§ 371 (c)(1),
(2) Date: Mar. 5, 2021

(87) PCT Pub. No.: WO2020/136718
PCT Pub. Date: Jul. 2, 2020

(65) Prior Publication Data
US 2021/0316254 A1   Oct. 14, 2021

(51) Int. Cl.
*B01D 65/02* (2006.01)
*B01D 53/22* (2006.01)
(Continued)

(52) U.S. Cl.
CPC ........... *B01D 65/02* (2013.01); *B01D 53/228* (2013.01); *B01D 71/028* (2013.01); *C10L 3/104* (2013.01);
(Continued)

(58) Field of Classification Search
None
See application file for complete search history.

(56) References Cited

U.S. PATENT DOCUMENTS

| 6,843,907 B1 | 1/2005 | Kanazirev et al. |
| 2014/0146838 A1* | 5/2014 | Germanenko ...... G03F 7/70008 372/34 |

FOREIGN PATENT DOCUMENTS

| JP | 2017148741 A | 8/2017 |
| JP | 2018183756 A | 11/2018 |

(Continued)

OTHER PUBLICATIONS

English language machine translation for WO 2016/027713. Retrieved from translationportal.epo.org on Dec. 27, 2022. (Year: 2022).*

(Continued)

*Primary Examiner* — Jason M Greene
(74) *Attorney, Agent, or Firm* — Jordan and Koda, PLLC; Steven P. Koda

(57) ABSTRACT

To regenerate, by a simple method, an inorganic separation membrane separating non-hydrocarbon gas contained in treatment target gas. Provided in separating the non-hydrocarbon gas contained in the treatment target gas is a regeneration gas supply path supplying moisture-containing regeneration gas to a primary side of the inorganic separation membrane in a separation membrane module. As a result, it is possible to regenerate the inorganic separation membrane by supplying moisture-containing $CO_2$ gas to the inorganic separation membrane and then supplying dry natural gas. Accordingly, there is no need to use dry regeneration gas and the $CO_2$ gas supplied via, for example, a pipeline can be used as it is.

22 Claims, 6 Drawing Sheets

(51) Int. Cl.
*B01D 71/02* (2006.01)
*C10L 3/10* (2006.01)

(52) U.S. Cl.
CPC ...... *B01D 2321/02* (2013.01); *B01D 2321/18* (2013.01); *B01D 2321/32* (2013.01); *C10L 2290/548* (2013.01)

(56) References Cited

FOREIGN PATENT DOCUMENTS

| WO | 2012147534 A1 | 11/2012 | |
| WO | WO 2016027713 A1 * | 2/2016 | ............. B01D 53/22 |
| WO | 2018180210 A1 | 10/2018 | |

OTHER PUBLICATIONS

English language machine translation for JP 2017-148741. Retrieved from translationportal.epo.org on Dec. 27, 2022. (Year: 2022).*

* cited by examiner

NON-HYDROCARBON GAS SEPARATION DEVICE AND INORGANIC SEPARATION MEMBRANE REGENERATION METHOD

BACKGROUND OF THE INVENTION

The present invention relates to a non-hydrocarbon separation device separating a non-hydrocarbon gas by using an inorganic separation membrane and an inorganic separation membrane regeneration method.

In a case where, for example, natural gas as a hydrocarbon gas produced from a well site is converted into Liquefied Natural Gas (LNG), pretreatment for removing various impurities from the natural gas that is yet to be liquefied and liquefaction treatment for obtaining the LNG by liquefying the pretreated natural gas are performed by means of various treatment facilities. Examples of the impurities contained in the natural gas include those containing a relatively large amount of non-hydrocarbon gas such as carbon dioxide ($CO_2$) gas and nitrogen ($N_2$) gas. It is necessary to remove these impurities in order to obtain a product gas as a raw material for liquefied natural gas or pipeline gas.

A non-hydrocarbon gas separation device separating non-hydrocarbon gas from natural gas includes, for example, an inorganic separation membrane made of zeolite or the like as illustrated in Patent Document 1. The non-hydrocarbon gas separation device separates the non-hydrocarbon gas such as $CO_2$ permeating the inorganic separation membrane and hydrocarbon gas incapable of permeating the inorganic separation membrane by allowing the non-hydrocarbon gas to permeate the inorganic separation membrane.

In such a non-hydrocarbon gas separation device, impurities in natural gas are adsorbed as a dirt component in the pores of the inorganic separation membrane and the permeation rate gradually decreases. Accordingly, inorganic separation membrane regeneration treatment is performed for dirt component removal from the inorganic separation membrane. Patent Document 1 describes a technique for regenerating an inorganic separation membrane by heating dry $CO_2$ gas and causing the gas to permeate the inorganic separation membrane.

However, a $CO_2$ gas that is relatively easy to obtain in a natural gas liquefaction facility, such as a $CO_2$ gas supplied by a pipeline or the like, often contains a large amount of moisture or the like. Meanwhile, some inorganic separation membranes easily take in moisture and a decline in non-hydrocarbon gas separation ability may arise with moisture taken in. This led to the necessity of a $CO_2$ gas drying facility or the like, which is a problem.

CITATION LIST

Patent Document

Patent Document 1: Japanese Patent Application No. 2017-148741

SUMMARY OF THE INVENTION

The invention has been made against such a background, and an object of the invention is to provide a technique for regenerating an inorganic separation membrane separating non-hydrocarbon gas contained in treatment target gas by a simple method.

The non-hydrocarbon gas separation device of the invention is a gas separation device separating non-hydrocarbon gas contained in treatment target gas. The non-hydrocarbon gas separation device includes:

a separation membrane module reducing the non-hydrocarbon gas in the treatment target gas by allowing the non-hydrocarbon gas to permeate an inorganic separation membrane from a primary side to a secondary side;

a treatment target gas supply path connected to a space on the primary side in the separation membrane module and supplying the treatment target gas containing the non-hydrocarbon gas;

a permeation gas flow path connected to a space on the secondary side in the separation membrane module and allowing permeation gas to flow out after the separation membrane is permeated;

a non-permeation gas flow path connected to the space on the primary side and allowing non-permeation gas to flow out after the permeation gas is separated;

a regeneration gas supply path connected to the space on the primary side and supplying regeneration gas as moisture-containing gas for regenerating a separation ability of the inorganic separation membrane; and a drying gas supply path connected to the space on the primary side and supplying drying gas for removing moisture taken into the inorganic separation membrane as a result of the supply of the moisture-containing regeneration gas.

The non-hydrocarbon gas separation device may be characterized in that:

(a) the treatment target gas supply path and the drying gas supply path are common and the treatment target gas is used as the drying gas.

(b) the regeneration gas is moisture-containing carbon dioxide gas.

(c) the non-hydrocarbon gas separation device includes a heating unit heating at least one of the regeneration gas and the separation membrane module.

(d) an internal temperature of the separation membrane module during the regeneration gas supply is higher than a dew point temperature and 250° C. or less.

(e) the regeneration gas has a moisture concentration of 1 ppmv or more.

(f) the regeneration gas supply path is connected to a treatment target gas inflow side in the separation membrane module.

(g) the regeneration gas supply path is connected to a non-permeation gas outflow side in the separation membrane module.

(h) the regeneration gas supply path is connected to the space on the primary side between a position where the treatment target gas is supplied from the treatment target gas supply path and a position where the non-permeation gas flows out to the non-permeation gas flow path.

The inorganic separation membrane regeneration method of the invention is a method for regenerating an inorganic separation membrane of a separation membrane module reducing non-hydrocarbon gas in treatment target gas by allowing the non-hydrocarbon gas in the treatment target gas to permeate the inorganic separation membrane from a primary side to a secondary side. The inorganic separation membrane regeneration method includes:

a step of regenerating a separation ability of the inorganic separation membrane by supplying moisture-containing regeneration gas to a space on the primary side; and a subsequent step of removing moisture taken into the inorganic separation membrane as a result of the supply of the moisture-containing regeneration gas by supplying drying gas.

In the invention, the moisture taken into the inorganic separation membrane is removed by means of the drying gas supplied from the drying gas supply path, and thus the inorganic separation membrane can be regenerated by means of the moisture-containing regeneration gas.

DETAILED DESCRIPTION OF PREFERRED EMBODIMENTS OF THE INVENTION

Figure 1:
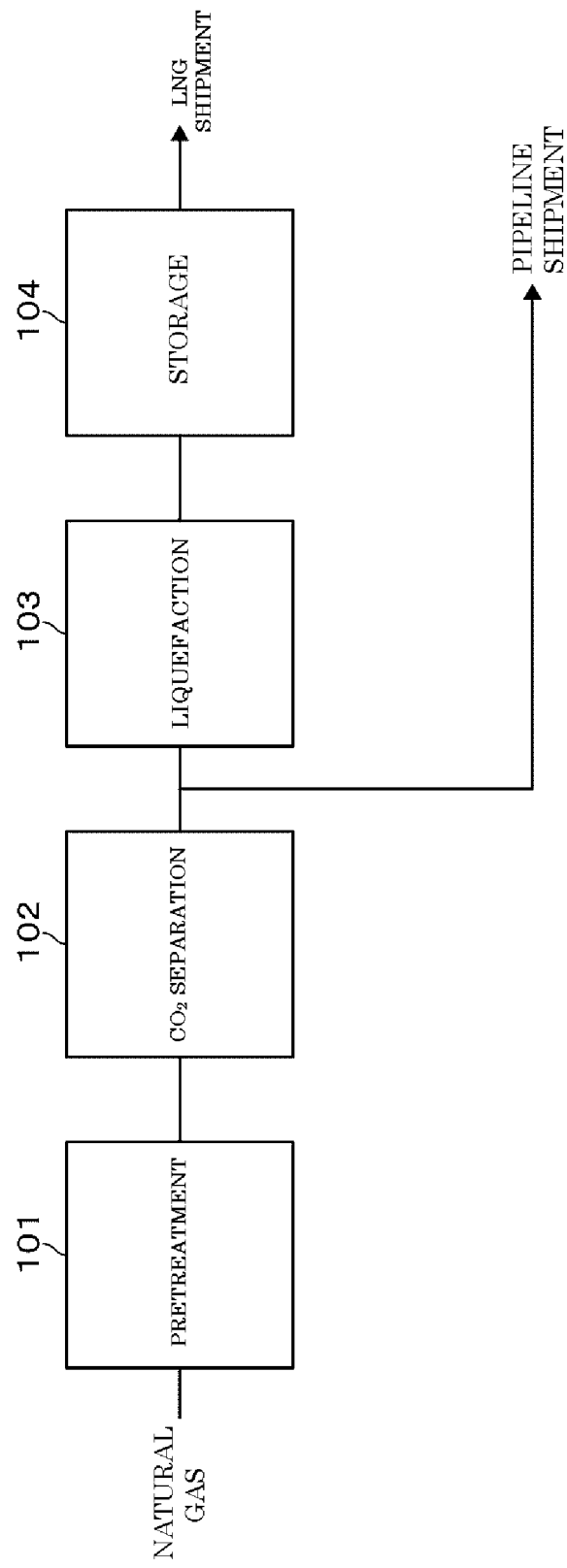
FIG. 1 is a process chart illustrating how natural gas is turned into a product.

The flow of natural gas treatment will be described first. As illustrated in FIG. 1, gas-liquid separation, moisture removal, and the like at pretreatment 101 are performed on the natural gas that is produced from a well site. Then, $CO_2$ gas separation 102 for removing $CO_2$, which is a non-hydrocarbon gas, is further performed. After the $CO_2$ gas removal, the natural gas may be supplied to a consumer via, for example, a pipeline or may become Liquefied Natural Gas (LNG) through liquefaction 103 and be shipped after storage 104.

Figure 2:
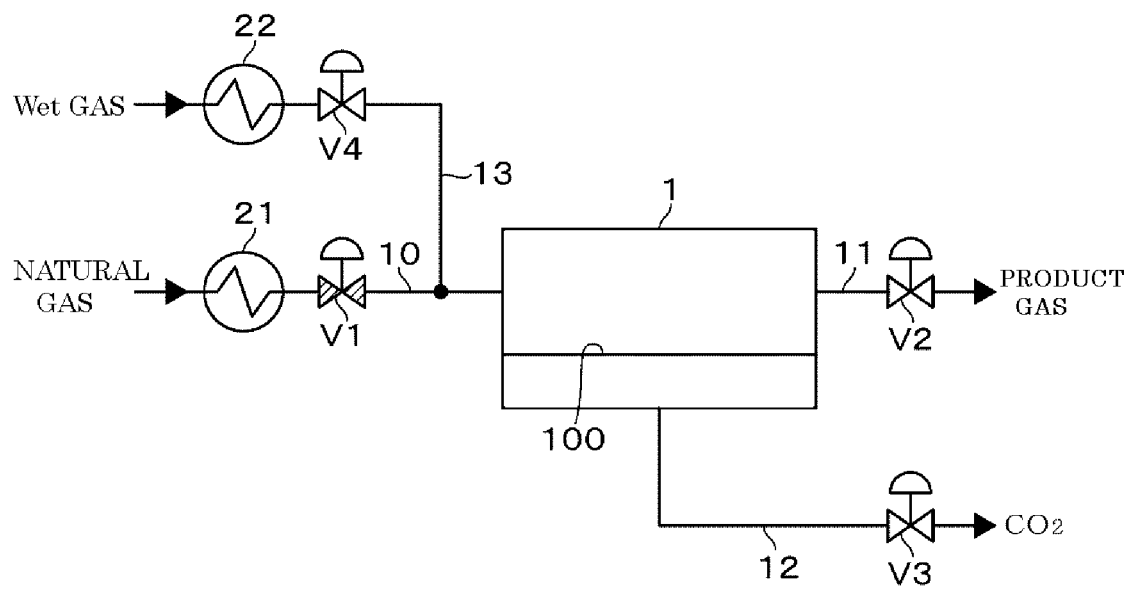
FIG. 2 is a configuration diagram illustrating a $CO_2$ separation device.

FIG. 2 is a configuration diagram illustrating a $CO_2$ separation device that is a non-hydrocarbon gas separation device used for the $CO_2$ gas separation 102. A separation membrane module 1 includes, for example, an inorganic separation membrane 100 separating $CO_2$ gas by permeation. Adopted as the material constituting the inorganic separation membrane 100 is, for example, an inorganic material highly resistant to heavy hydrocarbons such as a zeolite membrane of deca-dodecasil 3R (DDR) type.

The specific structure of the inorganic separation membrane 100 is not limited to a specific type, and examples thereof include a tubular member having a DDR-type zeolite membrane formed on the surface of a piping-shaped base body made of porous ceramic or the like. Further, a large number of the tubular members are stored in a metallic main body with the inorganic separation membrane 100 formed, the space on the primary side where natural gas flows and the space on the secondary side where the $CO_2$ gas separated from the natural gas flows are partitioned, and the separation membrane module 1 is configured as a result.

A natural gas supply path (treatment target gas supply path) 10 supplying natural gas to the space on the primary side of the inorganic separation membrane 100 is connected to the separation membrane module 1. Reference numeral 21 provided on the natural gas supply path 10 is a heating unit. Further, a product gas discharge path (non-permeation gas flow path) 11 for discharging the natural gas after flow through the space on the primary side and $CO_2$ gas separation (non-permeation gas) is connected to the separation membrane module 1. In addition, the separation membrane module 1 includes a $CO_2$ gas discharge path (permeation gas flow path) 12 discharging the permeation gas ($CO_2$ gas or the like) that has permeated the secondary side of the inorganic separation membrane 100.

In the $CO_2$ separation device having the above-described configuration, the inorganic separation membrane 100 is regenerated by means of regeneration gas for $CO_2$ permeation rate recovery after a decline attributable to dirt component adsorption. For this regeneration treatment, the $CO_2$ separation device of this example uses $CO_2$ gas relatively easy to obtain in a natural gas liquefaction facility. In particular, the device uses moisture-containing $CO_2$ gas, which has been considered inappropriate as regeneration gas in the related art.

Figure 8A:
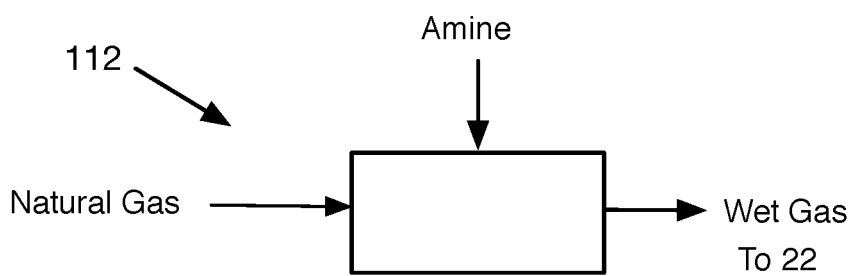
FIG. 8A is a block diagram of $CO_2$ gas provided from a natural gas liquefaction facility and removed from natural gas by means of amine.
Figure 8B:
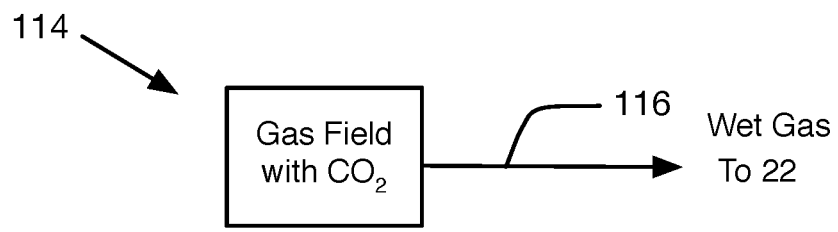
FIG. 8B is a block diagram of $CO_2$ gas supplied from a natural $CO_2$ gas field.

Examples of the moisture-containing gas include $CO_2$ gas provided in another natural gas liquefaction facility 112 (see FIG. 8A) and removed from natural gas by means of amine and $CO_2$ gas supplied from a natural $CO_2$ gas field 114 (see FIG. 8B). The $CO_2$ gas obtained from the amine contains near-saturation moisture, and the $CO_2$ gas supplied from the gas field 104 has a moisture amount of less than 2,000 ppmv.

A regeneration gas supply path 13 supplying, for example, a moisture-containing gas (Wet gas: regeneration gas) to the primary side of the inorganic separation membrane 100 in the separation membrane module 1 is connected to the natural gas supply path 10 of this example so that the above-described regeneration of the inorganic separation membrane 100 by means of the moisture-containing $CO_2$ gas (regeneration gas) is executed. V1 to V4 in FIG. 2 are valves, and 22 in FIG. 2 is a heating unit. Meanwhile, the inorganic separation membrane 100 made of an inorganic material such as zeolite easily takes in moisture and, in a state where moisture is taken in, the ability to separate $CO_2$ gas from natural gas may decline. Accordingly, the $CO_2$ gas separated from the natural gas by means of the amine and the $CO_2$ gas supplied from the $CO_2$ gas field were considered unsuitable for the regeneration of the inorganic separation membrane 100 and not used.

On the other hand, the $CO_2$ separation device of the present embodiment removes moisture by supplying a drying gas to the inorganic separation membrane 100 with the moisture taken in as a result of the regeneration treatment using the moisture-containing $CO_2$ gas. The $CO_2$ separation device of this example uses natural gas as this drying gas. Since the moisture is removed to, for example, 1 ppmv or less at the pretreatment 101, the natural gas is suitable as the drying gas releasing the moisture from the inorganic separation membrane 100. Accordingly, in the present embodiment, the natural gas supply path 10 serves as both a treatment target gas supply path and a drying gas supply path.

Figure 3:
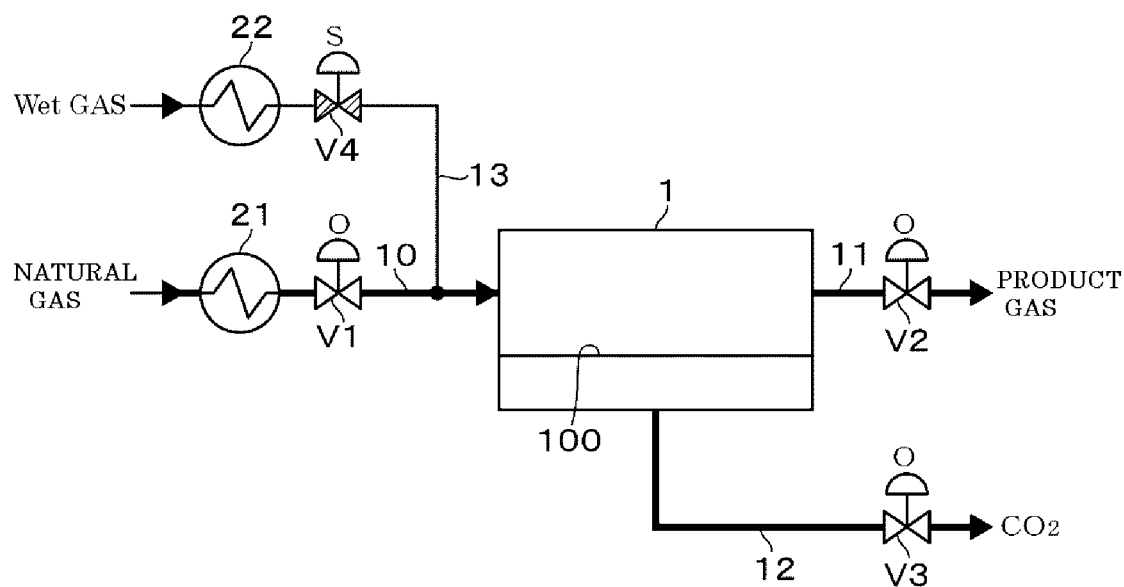
FIG. 3 is an explanatory operation diagram illustrating the $CO_2$ separation treatment in the $CO_2$ separation device.

The action of the $CO_2$ gas separation device having the above-described configuration will be described below. In FIGS. 3 to 6, for the valves V1, V2, V3, V4, and V5 the open-valve state is indicated in white with the reference numeral of O and the closed-valve state is indicated by a diagonal line with the reference numeral of S. During the natural gas-CO2 separation, for example, the valves V1, V2, and V3 are opened and the valve V4 is closed as illustrated in FIG. 3. The separation membrane module 1 becomes online by the valves being set as described above. With the moisture removed at the pretreatment 101, the natural gas is supplied to the primary side of the separation membrane module 1. The heating unit 21 provided on the natural gas supply path 10 heats the natural gas to the range of, for example, 20 to 150 C, and the natural gas is supplied to the space on the primary side in the separation membrane module 1. The natural gas comes into contact with the inorganic separation membrane 100, the $CO_2$ gas is separated from the natural gas and discharged via the $CO_2$ gas discharge path 12, and the natural gas separated from the $CO_2$ gas is discharged from the product gas discharge path 11.

Here, a decline in permeation rate (permeation performance) arises as the operating time of the separation membrane module 1 used in the invention increases. In other words, the decline in permeation performance means that the value of St/S0 increases along with increasing the operating time when S0 is the area (effective area) of the inorganic separation membrane 100 of the separation membrane module 1 that is new and St is the membrane area for making the permeation gas flow rate in a certain operating time equal to the permeation gas flow rate in the initial stage of the new separation membrane module 1.

It is estimated that the permeation performance of the separation membrane module 1 declines because impurities (mainly hydrocarbons of C3 or higher) contained in the natural gas are adsorbed as a dirt component in the pores of the zeolite constituting the inorganic separation membrane 100. In this regard, in the $CO_2$ gas separation device according to the invention, the inorganic separation membrane 100 is regenerated when, for example, the operating time of the $CO_2$ separation device has exceeded a predetermined time.

Figure 4:
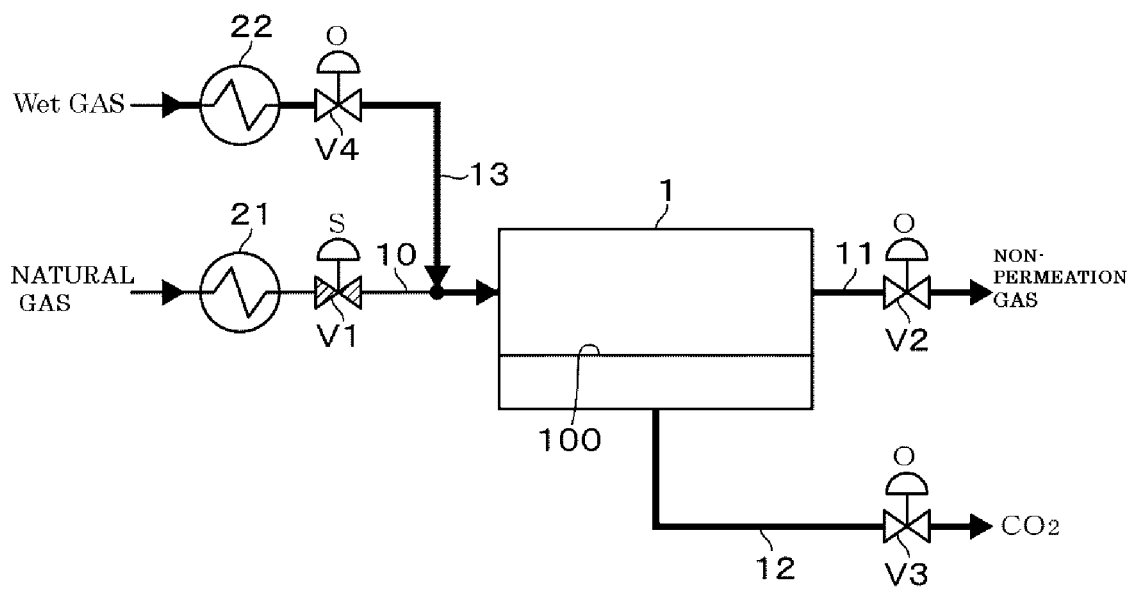
FIG. 4 is an explanatory operation diagram illustrating the regeneration treatment in the $CO_2$ separation device.

As illustrated in FIG. 4, during the regeneration of the inorganic separation membrane 100, the valve V1 of the natural gas supply path 10 is closed first. As a result, the separation membrane module 1 is put into a non-operating state. Further, the heating unit 22 heats the $CO_2$ gas to a temperature that is equal to or higher than the dew point temperature and 250° C. or less, such as 180° C., and the valve V4 of the regeneration gas supply path 13 is opened.

In addition, the dirt component removal efficiency of the inorganic separation membrane 100 is improved by the regeneration gas being heated and supplied. However, the inorganic separation membrane may be damaged when the moisture-containing gas is supplied to the inorganic separation membrane 100 at a high temperature, and thus it is preferable that the temperature is equal to or higher than the dew point temperature and 250° C. or less.

As a result, the moisture-containing $CO_2$ gas that is heated to 180° C. is supplied to the separation membrane module as the regeneration gas and permeates the inorganic separation membrane 100. It is conceivable that heat can be applied to the inorganic separation membrane 100, the molecular motion of the dirt component adsorbed in the pores can be promoted, and the dirt component desorbed from the pores can be removed from the separation membrane by riding the gas flow of carbon dioxide when the $CO_2$ gas is supplied for 16 to 32 hours (for 16 hours as an example). As a result, the dirt component adsorbed on the inorganic separation membrane 100 can be removed.

Meanwhile, the dirt component of the inorganic separation membrane 100 can be removed by the moisture-containing $CO_2$ gas being used as the regeneration gas. Meanwhile, since the inorganic separation membrane 100 is in a moisture-containing state, a sufficient separation performance may not be exhibitable even if it is used in this state.

In this regard, the natural gas supply is resumed as illustrated in FIG. 3 with, for example, the regeneration gas supplied and the dirt component sufficiently removed. In the moisture removal process at the pretreatment 101, the natural gas is in, for example, a state of being dry after flow to an adsorption tower such as a dehydration plant (10 ppmv or less in moisture concentration). Accordingly, the moisture adsorbed on the inorganic separation membrane 100 is quickly removed by the natural gas being supplied to the inorganic separation membrane 100.

However, as described above, the $CO_2$ gas separation performance of the inorganic separation membrane 100 may decline with moisture taken in. In this regard, flow rate adjustment for reducing the amount of natural gas supply per unit time as compared with normal occasions may be performed while drying is performed on the inorganic separation membrane 100. As a result, the concentration of the $CO_2$ gas contained in the natural gas flowing out of the product gas discharge path 11 can be maintained at a normal target concentration even during a period preceding the completion of the drying of the inorganic separation membrane 100.

According to the above-described embodiment, in the C02 separation device separating the C02 gas contained in the natural gas, the regeneration gas supply path 13 supplying the regeneration gas as the moisture-containing C02 gas is provided on the primary side of the inorganic separation membrane 100 in the separation membrane module 1. As a result, the inorganic separation membrane 100 can be regenerated by the moisture-containing C02 gas being supplied. The moisture taken into the inorganic separation membrane 100 by the moisture-containing C02 gas being used can be removed by the dry natural gas being subsequently supplied. Accordingly, there is no need to provide a dedicated treatment facility for drying the moisture-containing regeneration gas and the C02 gas normally supplied with moisture contained, such as the C02 gas supplied via a pipeline 116, (see FIG. 8B), can be used as it is.

Here, the moisture concentration of the regeneration gas may be 1 ppmv to saturation concentration and, preferably, can be in the range of, for example, 100 ppmv to saturation concentration. The regeneration gas is not limited to the moisture-containing $CO_2$ gas. Nitrogen gas or the like may be used as the regeneration gas insofar as the gas contains the above-described range of moisture. Alternatively, a light hydrocarbon (C≤2) such as methane gas and ethane gas may be used. In addition, a gas in which these gases are mixed may be used.

In addition, the drying gas supply is not limited to the case of using the natural gas supplied from the natural gas supply path 10. For example, a drying gas supply path for drying gas supply may be connected to the separation membrane module 1. In this case, the moisture adsorbed on the inorganic separation membrane 100 is removed by the drying gas being supplied from the drying gas supply path to the separation membrane module 1 after the regeneration gas is supplied and before the natural gas is supplied.

The time requiring the use of the drying gas can be shorter than in the related art in which the regeneration treatment by means of dry $CO_2$ gas is performed for 20 hours as an example.

The drying gas supplied from the dedicated drying gas supply path has only to be capable of desorbing moisture, and thus the gas is not particularly limited insofar as it is a dry gas. A case where, for example, dry $CO_2$ gas is used can be exemplified as the dry gas. Further, it is preferable to use a gas containing no hydrocarbon of C3 or higher from the viewpoint of suppressing the adsorption of the dirt component of the inorganic separation membrane 100 in a case where a gas other than the treatment target gas is used as the drying gas. For example, it is preferable that the moisture concentration of the drying gas is 100 ppmv or less and is lower than the moisture concentration of the regeneration gas with the moisture absorbed and removed by means of an absorbent such as triethylene glycol (TEG).

Figure 5:
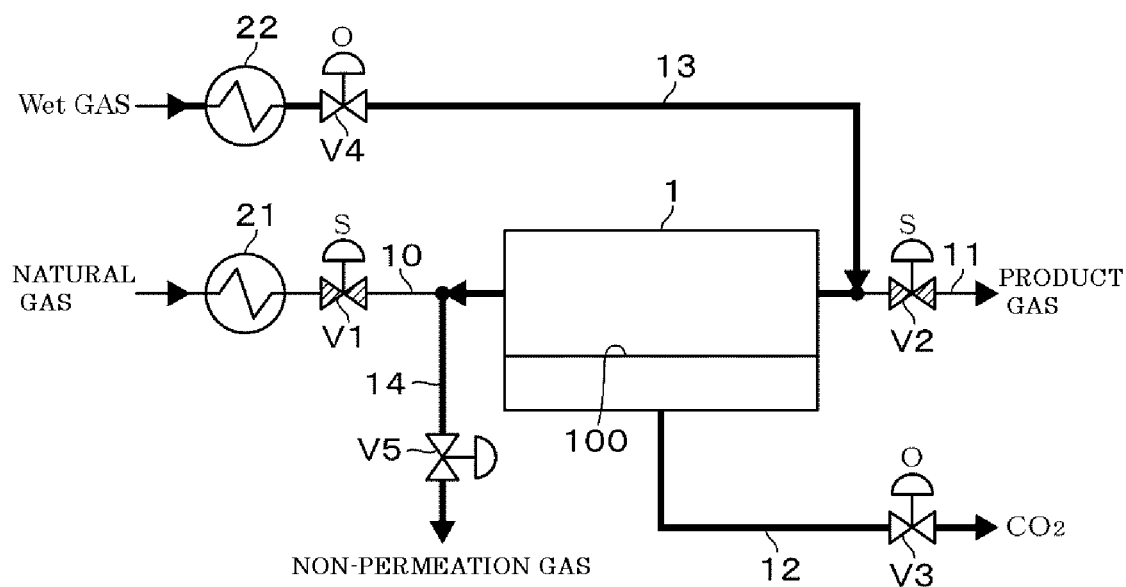
FIG. 5 is a configuration diagram illustrating another example of the regeneration gas supply path in the $CO_2$ separation device.

In addition, as illustrated in FIG. 5, the regeneration gas may be supplied from the rear side of the separation membrane module 1 with the regeneration gas supply path 13 connected to the product gas discharge path 11 side and a non-permeation gas discharge path 14 connected to the natural gas supply path 10. The inventors have found that the amount of dirt component adsorption may be larger when the inorganic separation membrane 100 is closer to the product gas discharge path 11 in a case where treatment is performed by natural gas supply from the natural gas supply path 10 to the separation membrane module 1. In this case, it is possible to enhance removal efficiency on the product gas discharge path 11 side, where the dirt component is easily adsorbed, by connecting the regeneration gas supply path 13 to the product gas discharge path 11 side and causing the regeneration gas to flow to the natural gas supply path 10 side from the product gas discharge path 11 side of the separation membrane module 1.

Figure 6:
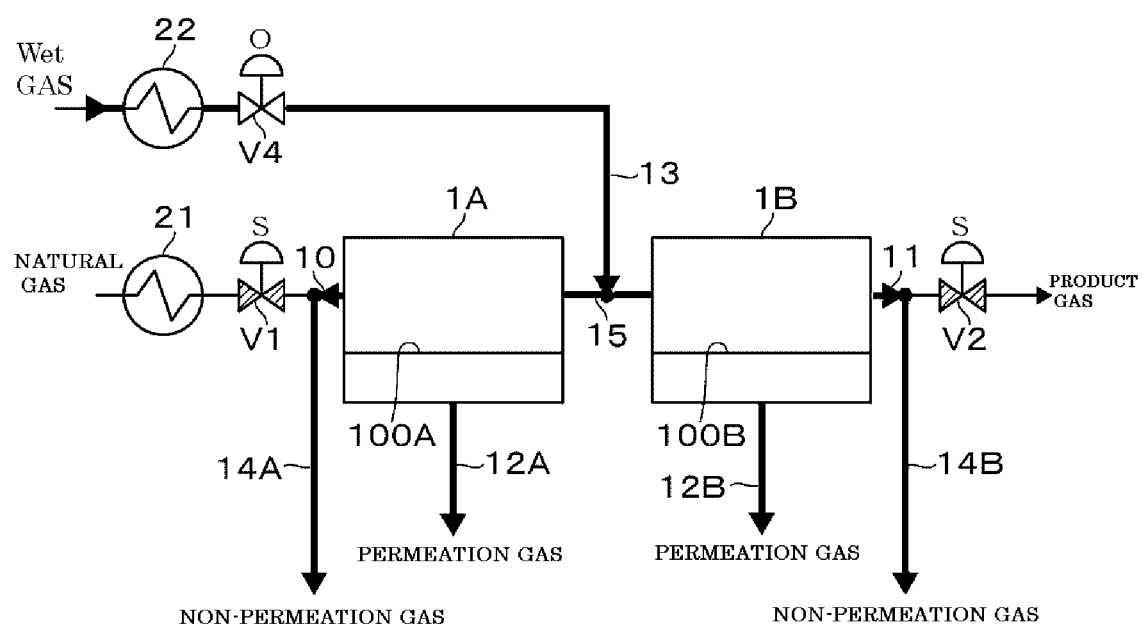
FIG. 6 is a configuration diagram illustrating yet another example of the regeneration gas supply path in the $CO_2$ separation device.

Further, two separation membrane modules 1A and 1B may be connected in series and the regeneration gas may be supplied between the separation membrane modules 1A and 1B as illustrated in FIG. 6. Further, the regeneration gas supply path 13 is connected to piping 15 between the separation membrane modules 1A and 1B and non-permeation gas discharge paths 14A and 14B are connected to the natural gas supply path 10 and the product gas discharge path 11, respectively. Then, the valves V1 and V2 are closed and the valve V4 is opened, as illustrated in FIG. 6, when the regeneration gas is supplied. As a result, the separation membrane module 1A is supplied with the regeneration gas from the natural gas discharge side and the separation membrane module 1B is supplied with the regeneration gas from the natural gas supply side. A similar effect can be obtained even in the case of such a configuration.

In addition, the invention is not limited to $CO_2$ gas separation devices and may be applied to, for example, nitrogen gas separation devices.

[Verification Test]

The following test was conducted to verify the effect of the invention. Using the inorganic separation membrane 100 used in the embodiment, a hydrocarbon of C3 or higher was adsorbed on the inorganic separation membrane 100 as a dirt component. Then, a regeneration gas consisting of moisture-containing $CO_2$ gas (example: 1,000 ppmv in moisture concentration) and a regeneration gas consisting of $CO_2$ gas (reference example: 3 ppmv in moisture concentration) were respectively supplied to regenerate the inorganic separation membrane 100 and the change over time in the $CO_2$ gas permeation rate of the inorganic separation membrane 100 was measured. The temperature of the supplied regeneration gas was set to 90° C. at the initiation of the supply and set to reach 180° C. in 4 hours. Subsequently, treatment at 180° C. was performed for 20 hours. Then, the temperature was lowered to 90° C. over 3 hours and the regeneration gas supply was terminated.

Figure 7:
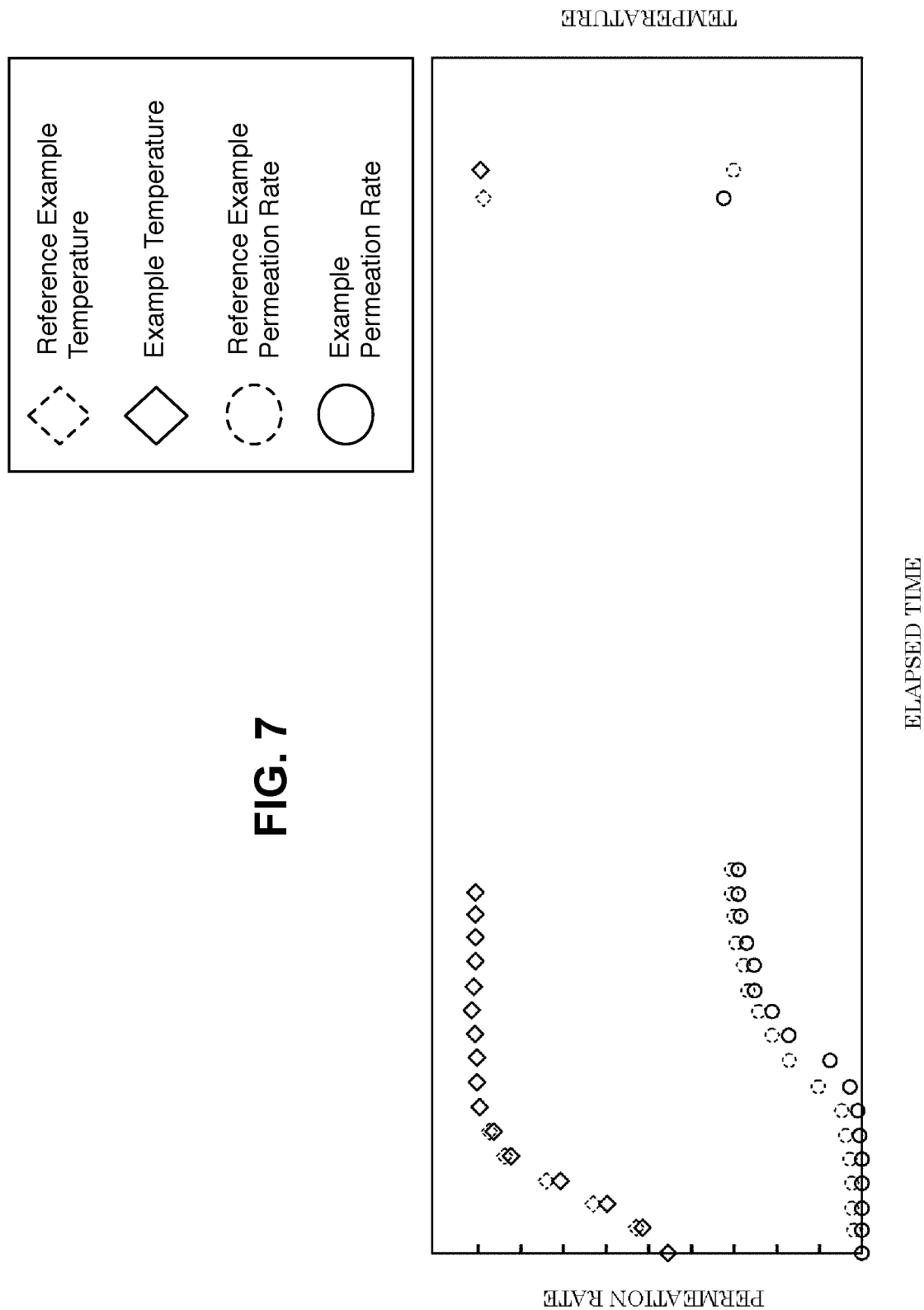
FIG. 7 is a graph diagram showing how the permeation rate changes over time in an example and a reference example.

FIG. 7, which shows this result, is a graph diagram showing how the permeation rate of the inorganic separation membrane 100 changes over time in the example and the reference example. As shown in FIG. 7, the permeation rate of the inorganic separation membrane 100 showed almost the same behavior in the example and the reference example. In addition, almost the same permeation rate was obtained in the example compared to the permeation rate of the inorganic separation membrane 100 before the dirt component adsorption. Accordingly, it can be said that the dirt component of the inorganic separation membrane 100 can be removed and sufficient regeneration is possible even in the example.

REFERENCE SIGNS LIST

1 Separation membrane module
10 Natural gas supply path
11 Product gas discharge path
12 $CO_2$ gas discharge path
13 Regeneration gas supply path
21, 22 Heating unit
100 Inorganic separation membrane

The invention claimed is:

1. A gas separation device separating non-hydrocarbon gas contained in treatment target gas, the non-hydrocarbon gas separation device comprising:
a separation membrane module reducing the non-hydrocarbon gas in the treatment target gas by allowing the non-hydrocarbon gas to permeate an inorganic separation membrane from a primary side to a secondary side;
a treatment target gas supply path connected to a space on the primary side in the separation membrane module and supplying the treatment target gas containing the non-hydrocarbon gas;
a permeation gas flow path connected to a space on the secondary side in the separation membrane module and allowing permeation gas to flow out after the separation membrane is permeated;
a regeneration gas supply path connected to the space on the primary side and supplying regeneration gas for regenerating a separation ability of the inorganic separation membrane, wherein the regeneration gas supply path receives moisture containing carbon dioxide gas, as the regeneration gas, that is either one of (i) removed from a source natural gas using an amine or (ii) sourced from a natural carbon dioxide gas field;
a drying gas supply path connected to the space on the primary side and supplying drying gas for removing moisture taken into the inorganic separation membrane as a result of the supply of the moisture-containing regeneration gas; and
a pipeline for providing the moisture containing carbon dioxide gas from a gas field containing carbon dioxide to the regeneration gas supply path.

2. The non-hydrocarbon gas separation device according to claim 1, wherein the treatment target gas supply path and the drying gas supply path are common and the treatment target gas is used as the drying gas.

3. The non-hydrocarbon gas separation device according to claim 1, comprising a heating unit heating at least one of the regeneration gas and the separation membrane module.

4. The non-hydrocarbon gas separation device according to claim 3, wherein an internal temperature of the separation membrane module during the regeneration gas supply is higher than a dew point temperature and 250° C. or less.

5. The non-hydrocarbon gas separation device according to claim 1, wherein the regeneration gas has a moisture concentration of 1 ppmv or more.

6. The non-hydrocarbon gas separation device according to claim 1, wherein the regeneration gas supply path is connected to a treatment target gas flow path in the separation membrane module.

7. The non-hydrocarbon gas separation device according to claim 1, wherein the regeneration gas supply path is connected to a non-permeation gas outflow side in the separation membrane module.

8. The non-hydrocarbon gas separation device according to claim 1, wherein the regeneration gas supply path is connected to the space on the primary side between a position where the treatment target gas is supplied from the treatment target gas supply path and a position where the non-permeation gas flows out to the non-permeation gas flow path.

9. A method for regenerating an inorganic separation membrane of a separation membrane module reducing non-hydrocarbon gas in treatment target gas by allowing the non-hydrocarbon gas in the treatment target gas to permeate the inorganic separation membrane from a primary side to a secondary side, the inorganic separation membrane regeneration method comprising:
 a step of regenerating a separation ability of the inorganic separation membrane by supplying regeneration gas to a space on the primary side, wherein the regeneration gas is a moisture-containing carbon dioxide gas that is either one of (i) removed from natural gas using an amine or (ii) sourced from a natural carbon dioxide gas field; and
 a subsequent step of removing moisture taken into the inorganic separation membrane as a result of the supply of the moisture-containing regeneration gas by supplying drying gas.

10. The inorganic separation membrane regeneration method according to claim 9, wherein the treatment target gas is used as the drying gas.

11. The inorganic separation membrane regeneration method according to claim 9, wherein an internal temperature of the separation membrane module during the regeneration gas supply is higher than a dew point temperature and 250° C. or less.

12. The inorganic separation membrane regeneration method according to claim 9, wherein the regeneration gas has a moisture concentration of 1 ppmv or more.

13. A gas separation device separating non-hydrocarbon gas contained in treatment target gas, the non-hydrocarbon gas separation device comprising:
 a separation membrane module reducing the non-hydrocarbon gas in the treatment target gas by allowing the non-hydrocarbon gas to permeate an inorganic separation membrane from a primary side to a secondary side;
 a treatment target gas supply path connected to a space on the primary side in the separation membrane module and supplying the treatment target gas containing the non-hydrocarbon gas;
 a permeation gas flow path connected to a space on the secondary side in the separation membrane module and allowing permeation gas to flow out after the separation membrane is permeated;
 a regeneration gas supply path connected to the space on the primary side and supplying regeneration gas for regenerating a separation ability of the inorganic separation membrane, wherein the regeneration gas supply path receives moisture containing carbon dioxide gas, as the regeneration gas, that is either one of (i) removed from a source natural gas using an amine or (ii) sourced from a natural carbon dioxide gas field;
 a drying gas supply path connected to the space on the primary side and supplying drying gas for removing moisture taken into the inorganic separation membrane as a result of the supply of the moisture-containing regeneration gas; and
 wherein the moisture containing carbon dioxide gas is sourced from a natural gas liquefaction facility wherein the moisture containing carbon dioxide gas is extracted from natural gas using amine.

14. The inorganic separation membrane regeneration method according to claim 9, further comprising:
 a step of obtaining the moisture-containing carbon dioxide gas from natural gas using an amine, wherein regeneration is achievable for all moisture concentrations of the moisture containing carbon dioxide gas occurring within a range of 1 ppmv to saturation.

15. The inorganic separation membrane regeneration method according to claim 9, further comprising:
 a step of obtaining the moisture-containing carbon dioxide gas from a gas field via a pipeline.

16. The non-hydrocarbon gas separation device according to claim 13, wherein the treatment target gas supply path and the drying gas supply path are common and the treatment target gas is used as the drying gas.

17. The non-hydrocarbon gas separation device according to claim 13, comprising a heating unit heating at least one of the regeneration gas and the separation membrane module.

18. The non-hydrocarbon gas separation device according to claim 17, wherein an internal temperature of the separation membrane module during the regeneration gas supply is higher than a dew point temperature and 250° C. or less.

19. The non-hydrocarbon gas separation device according to claim 13, wherein the regeneration gas has a moisture concentration of 1 ppmv or more.

20. The non-hydrocarbon gas separation device according to claim 13, wherein the regeneration gas supply path is connected to a treatment target gas flow path in the separation membrane module.

21. The non-hydrocarbon gas separation device according to claim 13, wherein the regeneration gas supply path is connected to a non-permeation gas outflow side in the separation membrane module.

22. The non-hydrocarbon gas separation device according to claim 13, wherein the regeneration gas supply path is connected to the space on the primary side between a position where the treatment target gas is supplied from the treatment target gas supply path and a position where the non-permeation gas flows out to the non-permeation gas flow path.

* * * * *